Oct. 24, 1967        A. HARMENS        3,348,384
PROCESS FOR THE PARTIAL LIQUEFACTION OF A GAS MIXTURE
Filed Dec. 16, 1965
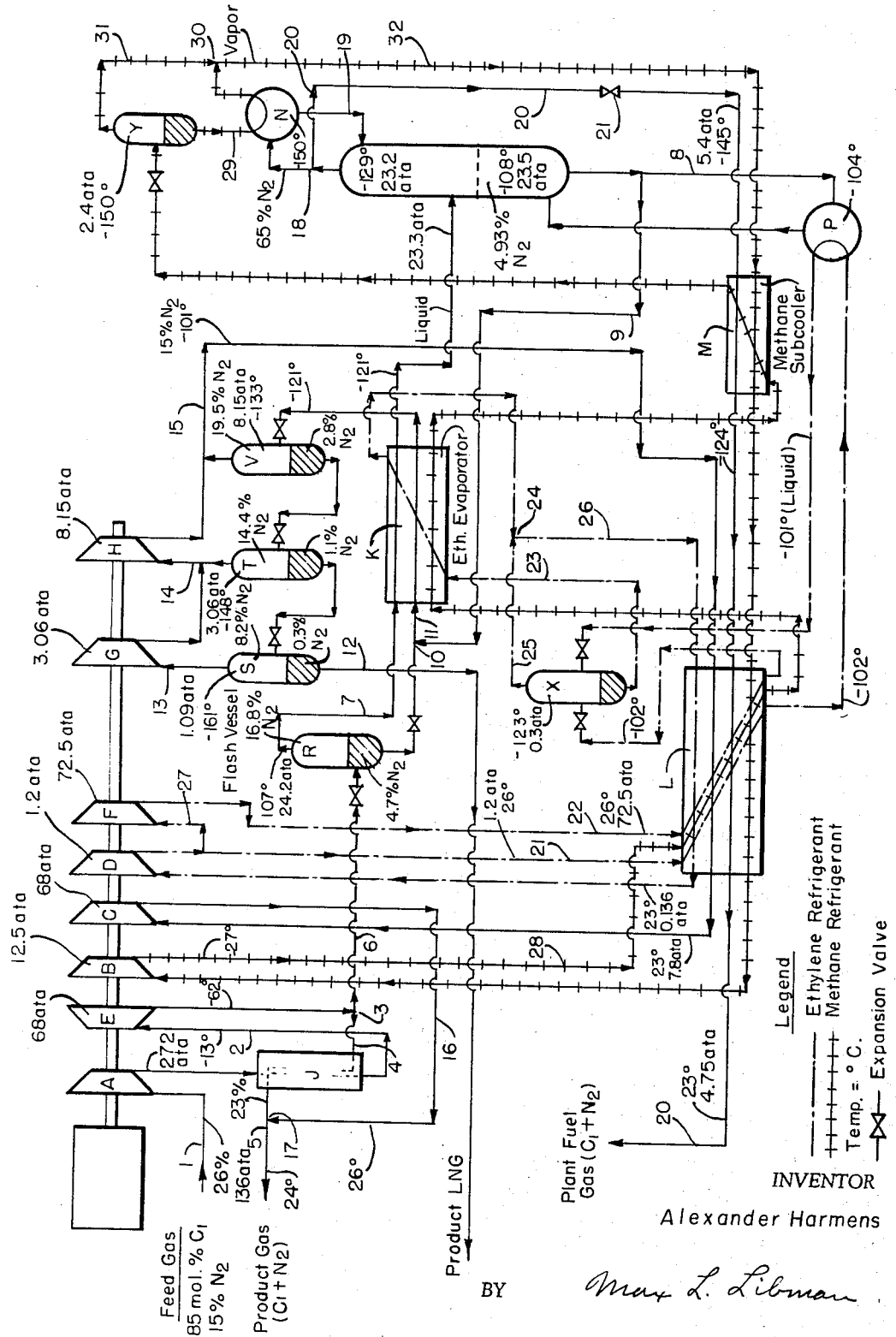
INVENTOR
Alexander Harmens
BY    Max L. Libman
ATTORNEY

United States Patent Office

3,348,384
Patented Oct. 24, 1967

3,348,384
PROCESS FOR THE PARTIAL LIQUEFACTION
OF A GAS MIXTURE
Alexander Harmens, Purley, England, assignor to Conch
International Methane Limited, Nassau, Bahamas, a
Bahamian company
Filed Dec. 16, 1965, Ser. No. 514,335
Claims priority, application Great Britain,
Feb. 19, 1965, 7,300/65
10 Claims. (Cl. 62—28)

This invention relates to a process for the partial liquefaction of a mixture of gaseous components, one of which is combustible, and in particular to the purification of natural gas containing a relatively high proportion of nitrogen as the main contaminant.

Large quantities of natural gas containing about 15 mole percent of nitrogen as the main impurity have been discovered in the Netherlands. This gas in many instances is available at a fairly high wellhead pressure. For several commercial applications it is desirable to liquefy part of the high pressure gas stream produced by a well or a group of wells, at the same time removing substantially all nitrogen from this part of the gas. The remaining gas must be available at a reduced pressure and with unchanged nitrogen content. The primary object of this invention is to derive two product streams of such nature from the given feed gas, utilizing the valuable high initial gas pressure. The process of the invention also produces a low value fuel gas in sufficient quantity and of sufficient calorific value to supply the necessary power for the installation. Furthermore, energy is obtained from expanding the compressed feed stream in an expansion machine. Also in the process of this invention all cold to be rejected by outgoing streams can be used to cool the refrigerants used in the process.

Accordingly, in the present invention, from a dry and acid-free feed stream comprising a combustible higher boiling component, and a lower boiling component, a liquefied product comprising substantially only higher boiling component, and a gaseous product of specified proportion of the lower boiling component is obtained by a process in which the feed stream at high pressure is cooled to sub-ambient temperature, is expanded in an expansion machine, and expanded gas is flashed into a feed stream flash vessel. The flash vapors from the feed stream flash vessel are condensed by indirect heat exchange with a boiling refrigerant and fed to a distillation column. The distillation top gas is produced of controlled composition and quantity of the lower boiling component to meet the fuel gas requirements of the process and is removed, whereas the bottom product from the column is mixed with the flash liquid from the feed stream flash vessel. The admixed liquids are flashed in a second flash, and the composition of the bottom product from the column is controlled so that the vapors from the second flash have the specified proportion of lower boiling component. Liquid from the second flash is removed as the liquefied product and flash vapors from the second flash are removed as the gaseous product.

The feed stream is preferably natural gas containing nitrogen, for example about 15 mol percent nitrogen, as the main impurity. This stream may, however, be other mixture of gases comprising a combustible higher boiling component and a lower boiling component, for example the impure gaseous hydrocarbons removed from coke-oven gas after the removal of hydrogen, which impure hydrocarbons can be separated into combustible hydrocarbons and a mixture of nitrogen and carbon monoxide.

Whatever feed stream is used it must be dry and free from acid gases such as carbon dioxide or hydrogen sulphide so that trouble is not caused due to separation of solid materials during the various steps of the process.

The feed stream if not already available at a high pressure should be compressed first, and the pressure to which the gas is raised should be great enough so that after being cooled to sub-ambient temperature and then expanded in an expansion machine the gas will flash to a liquid and vapor. Thus for a mixture of about 85 mol percent methane and 15 mol percent nitrogen the feed stream should be at, or compressed to a pressure of over 200 atmospheres, e.g. about 275 atmospheres.

Preferably after cooling by indirect heat exchange with water or other readily available fluid of about ambient temperature, the feed stream before expansion is then cooled to sub-ambient temperature. This cooling may be achieved by indirect heat exchange with a separate refrigerant, but is conveniently achieved by indirect heat exchange with part of the feed stream after it has been expanded in an expansion machine. The cooling need not be exceptionally great, but is of course a function of the nature of, and the initial pressure of, the feed stream. Thus, for a mixture of about 85 mol percent methane and 15 mol percent nitrogen compressed to about 275 atmospheres, the feed stream should be cooled to below 0° C., e.g., about −15° C.

The feed stream is then expanded in an expansion machine, e.g. an expansion turbine, and the work thereby obtained is preferably used in driving the compressors needed in the process.

After being expanded the feed stream is preferably divided, one portion being used to cool by indirect heat exchange the high pressure feed stream before expansion as described above, whilst the other portion is fed to the feed stream flash vessel.

When the feed stream is flashed via a throttle valve into the feed stream flash vessel its temperature is reduced considerably and liquid and vapor are obtained in the flash vessel. The liquid will be more rich in, and the vapor more lean in, the higher boiling component than the feed stream.

The flash vapors are condensed by indirect heat exchange with a boiling refrigerant, for example, evaporating ethylene when the feed stream contains methane, and then fed to a distillation column.

From the distillation column a stop gas is obtained and by controlling the temperature of the reflux liquid and/or adjusting the number of effective contact trays in the top part of the column, its composition and quantity is controlled so that it is of sufficient calorific value to meet the fuel gas requirements of the plant. Thus by using this top gas and the work generated by the expansion machine, the process is self-supporting as regards power and only uses work performed by expanding gas, and only consumes low value fuel gas produced by the process.

Bottom liquid product from the distillation column is mixed with the flash liquid from the feed stream flash vessel and the admixed liquids are preferably cooled before being flashed in the second flash. This cooling may be conveniently achieved by subjecting the admixed liquids to indirect heat exchange by the same refrigerant and in the same heat exchanger, as is used to condense the flash vapors from the feed stream flash vessel.

The second flash may be carried out in one flash vessel, but is preferably carried out in a plurality of flash vessels, for example three vessels, in which the liquid from one vessel is flashed into the next flash vessel and the flash vapors from each of the vessels are separately compressed to the pressure of the flash vapors in the upstream flash vessel and thereafter combined with the flash vapors from the upstream flash vessel. The liquefied product comprising substantially only combustible component is obtained as liquid from the only or the downstream flash vessel of the second flash.

In order that the vapors from the second flash, i.e. the vapors from the only second flash vessel, or the vapors from the upstream second flash vessel mixed with the compressed vapors from the downstream second flash vessels, have the specified proportion of lower boiling component, the composition of the bottom product from the distillation column is controlled i.e. by adjusting the temperature of the reboiler, and/or by adjusting the number of effective contact trays in the lower part of the column.

The flash vapors from the second flash are preferably compressed to a higher pressure before being removed as the gaseous product. When, as in a preferred embodiment of the invention the feed stream after being expanded in an expansion machine is divided, one portion being used to cool the feed stream, this portion of the feed stream may be conveniently mixed with flash vapors from the second flash after these vapors have been compressed to the appropriate pressure.

The boiling refrigerant used to condense the flash vapors from the feed stream flash vessel, preferably after being compressed and cooled, may be used in the column reboiler to heat the column bottom product whence the refrigerant vapors condense.

The refrigerant used in the condenser of the distilling column where it evaporates, may be the higher boiling component itself, i.e. when the feed stream comprises methane and nitrogen, the refrigerant may be methane. Also this refrigerant may be conveniently condensed by passing it through the heat exchanger in which the flash vapors from the feed stream flash vessel are condensed.

The distillation top gas before being removed as a fuel is preferably passed in indirect heat exchange with one or more of the refrigerants so that the refrigerant is cooled and the top gas heated.

Likewise, the flash vapors from the second flash before being removed as the gaseous product are preferably heat exchanged with one of the refrigerants so that the refrigerant is cooled and the flash vapors heated.

The invention is now described with reference to the accompanying drawing which is a flow line drawing of a method of partially liquefying natural gas.

Dry, sweetened natural gas consisting of 85 mol percent methane and 15% nitrogen enters the plant via line 1 at 26.6° C. and 136 ata. It is compressed in compressor A in a single state to 272 ata. and aftercooled (not shown) against water to 26.6° C. The gas is then cooled in heat exchanger J to −13.5° C. by indirect heat exchange with cold pipeline gas leaving the plant. The high pressure gas passing through line 2 then expands to 68 ata. in an expansion machine E, generating useful power and cooling down to −67.2° C. The cold gas stream now divides at 3: about 40% of the gas in line 4 returns through the heat exchanger J in which it heats up to 23.3° C. and is delivered in line 5 as part of the pipeline product gas. The rest of the 68 ata. gas through line 6 enters the partial liquefaction part of the plant.

First this gas is flashed to 24.2 ata. in the feed gas flash vessel R. The temperature falls to −107.8° C. and 14.9% of the incoming material condenses into a liquid which contains 4.7% nitrogen. The flash vapors containing 16.8% nitrogen pass through line 7 into heat exchanger K which is cooled by evaporating ethylene and where the flash vapors are completely condensed at −121.2° C. The condensed vapors enter the distilling column Q as a saturated liquid of that temperature, at 23.3 ata. The liquid from the bottom of the column contains 4.93% nitrogen and is at −108.1° C., 23.5 ata. It flows partly via line 8 to the reboiler P to be evaporated at −104.5° C. Another part is withdrawn through line 9 and is mixed at 10 with the liquid from the feed gas flash vessel R. This mixture flowing in line 11 and which contains 4.9% nitrogen, is subcooled to −121.2° C. in the ethylene evaporated K and is subjected to three successive flash evaporations.

In the first flash down to 8.15 ata. in vessel V 12.6% of the incoming liquid evaporates. The temperature drops to −133.3° C.; the flash vapor containing 19.5% nitrogen and the liquid 2.8% nitrogen. In the second flash down to 3.06 ata. in vessel T 12.8% of this liquid evaporates. The temperature drops to −148.4° C.; the flash vapor containing 14.4% nitrogen and the liquid 1.1% nitrogen. In the third and final flash, down to 1.09 ata. in vessel S 10.1% of this liquid evaporates. The temperature now drops to −161.8° C.; the flash vapor containing 8.2% nitrogen and the liquid 0.3% nitrogen. This liquid leaves the plant through line 12 as product liquefied natural gas.

The 1.09 ata. flash gas from the third vessel S passing through line 13 is compressed in a single state in compressor G to 3.06 ata. and mixed in line 14 with the flash gas of that pressure from the second flash vessel T. The mixture contains 11.87% nitrogen and is at −135.1° C. This mixture is again compressed in a single stage in compressor H to 8.15 ata. and mixed in line 15 with the flash gas of that pressure from the first flash vessel V. This final mixture contains 15% nitrogen and is at −101.1° C. The gas now passes through a large heat exchanger L in which incoming refrigerants are cooled, and the gas heats up to 23.3° C. It is then compressed from 7.8 ata. to 68 ata. in two stages in compressor C with inter- and aftercooling (not shown) down to 26.6° C. This compressed gas passing through line 16 is combined at 17 with the gas in line 5 and the combined product pipeline gas leaves the installation at 24.4° C.

A gas containing 65% nitrogen leaves the top of the distillation column Q at −129.5° C., 23.2 ata. About 65% of this gas in line 18 goes to the condenser N to be liquefied at −150.0° C. and is returned to the column through line 19 as reflux.

The rest of the top gas passing through line 20 first goes through an expansion valve 21 down to a pressure of 5.4 ata. and a temperature of −145.0° C. It then passes through the methane subcooler M, leaving it at −124.2° C., and through the large heat exchanger L from which it emerges at 23.3° C., 4.75 ata. to be used as fuel for the plant's prime mover.

Ethylene refrigerant at 26.6° C. enters the large heat exchanger L at two different pressure levels. About a third of the total ethylene flow enters through line 21 at 1.2 ata. and the rest through line 22 at 72.5 ata. Both streams are cooled down to −102.0° C. in the heat exchanger L and the high pressure stream then flashes to a pressure of 0.3 ata. in the ethylene flash vessel X. The low pressure stream is first condensed at −101.4° C. in the distilling column reboiler P and then flashes into the same flash vessel X. The material in the flash vessel is at a temperature of −123.1° C. and 9% of the total incoming ethylene evaporates. All flash liquid goes in line 23 to the ethylene evaporator K where it evaporates completely at −123.1° C. in heat exchange with process streams and refrigerant methane. The evaporated ethylene combines at 24 with the vapor from the flash vessel X in line 25 and the combined streams in line 26 return to the compressors D and F through the large heat exchanger L, in which the gas heats up to 23.3° C. at 0.136 ata. The compressor D first compresses all the ethylene up to 1.2 ata. in three stages. The low pressure ethylene branches off in line 21 and the remaining gas in line 27 is compressed to 72.5 ata. in five stages in compressor F. In these compressions the gas is aftercooled and intercooled (not shown) to 26.6° C. by water.

Methane refrigerant at 26.6° C., 11.9 ata. enters the large heat exchanger L through line 28 and is chilled to −102.0° C. It is then further cooled and completely condensed at −121.2° C. in the ethylene evaporator K. The liquid methane is then subcooled to −138.2° C. in heat exchange with outgoing gases in methane subcooler M and flashed into flash vessel Y to 2.4 ata., −150.0° C. The flash liquid in line 29 evaporates at −150° C. in condenser N of the distilling column Q and the vapor in line 29 combines at 30 with the vapor from the flash vessel Y in line 31. The combined gases in line 32 heat up to −124.2° C. in the methane subcooler M and further to 23.3° C. in the large heat exchanger L. The gas is then compressed in compressor B from 1.5 to 12.5 ata. in three stages. There is intercooling and aftercooling (not shown) to 26.6° C. by water.

It will be apparent that the embodiments shown are only exemplary and that various modifications can be made in construction and arrangement within the scope of the invention as defined in the appended claims.

I claim:
1. Process for obtaining a liquefied product and a gaseous products from
   a gaseous feed mixture from which have been removed the impurities of water and acid to provide an impurity free feed stream essentially of
      a combustible higher boiling point component and a lower boiling point component,
   said liquefied product comprising substantially only higher boiling component,
   said gaseous product having a specified proportion of the lower boiling component;
said process comprising the steps of
   (a) cooling the impurity free feed stream at high pressure to sub-ambient temperature,
   (b) expanding the cooled feed stream in an expansion machine,
   (c) flashing expanded gas from step (b) into a feed stream flash vessel,
   (d) condensing the flash vapors from the feed stream flash vessel by indirect heat exchange with a boiling refrigerant,
   (e) feeding said condensed vapors to a distillation column to produce a top gas and a bottom product,
   (f) maintaining the distillation conditions in said column such as to produce said top gas of the proper controlled composition and of such quantity of the lower boiling component as to be suitable for fuel gas for the process, a part of the top gas being condensed by a refrigerant,
   (g) mixing bottom product of said column with the flash liquid from the feed stream flash vessel (step (c)),
   (h) flashing said admixed liquids in a second flash step to produce top vapors and bottom liquid,
   (i) controlling the composition of the bottom product of the column (step (e)) so that said top vapors (step (h)) have the above specified proportion of lower boiling component,
   (j) removing said bottom liquid (step (h)) as the liquefied product and said top vapors as the gaseous product.

2. Process as claimed in claim 1 in which the feed stream comprises about 85 mol percent methane and about 15 mol percent nitrogen.
3. A process as claimed in claim 2 in which the feed stream is compressed to over 200 atmospheres.
4. A process as claimed in claim 3 in which the feed stream at high pressure is cooled to below 0° C.
5. A process as claimed in claim 1 in which the feed stream after expansion is divided, one portion being used to cool by indirect heat exchange the high pressure feed stream before its expansion, the other portion being fed to the feed stream flash vessel.
6. A process as claimed in claim 5 in which the portion of the feed stream used to cool the feed stream before its expansion is mixed with flash vapors from the second flash after these vapors have been compressed to the appropriate pressure.
7. A process as claimed in claim 1 in which the bottom product from the distillation column mixed with the flash liquid from the feed stream flash vessel, before being flashed in the second flash, are cooled by indirect heat exchange with the same refrigerant and in the same heat exchanger as used to condense the flash vapors from the feed stream flash vessel (step (d)).
8. A process as claimed in claim 1 in which the second flash is carried out in a plurality of flash vessels in which the liquid from one vessel is flashed into the next flash vessel and the flash vapors from each of the vessels are separately compressed to the pressure of the flash vapors in the upstream vessel and thereafter combined with the flash vapors from the upstream flash vessel.
9. A process as claimed in claim 8 in which the refrigerant used in the condenser of the distilling column is the higher boiling component itself.
10. A process as claimed in claim 9 in which the distilling column condenser refrigerant is condensed by passing it through the heat exchanger in which the flash vapors from the feed stream flash vessel are condensed (step (d)).

References Cited
UNITED STATES PATENTS

| | | | |
|---|---|---|---|
| 2,500,129 | 3/1950 | Laverty et al. | 62—27 |
| 3,079,759 | 3/1963 | Schilling. | |
| 3,160,489 | 12/1964 | Brocoff et al. | 62—23 X |
| 3,205,669 | 9/1965 | Grossmann | 62—28 X |
| 3,246,478 | 4/1966 | Kornemann et al. | 62—38 X |
| 3,261,169 | 7/1966 | Harmens | 62—40 X |
| 3,282,060 | 11/1966 | Hays | 62—24 |
| 3,315,475 | 4/1967 | Harmens | 62—23 X |

NORMAN YUDKOFF, *Primary Examiner.*

V. W. PRETKA, *Assistant Examiner.*